United States Patent
Kazi et al.

(10) Patent No.: US 7,477,707 B2
(45) Date of Patent: Jan. 13, 2009

(54) COMPUTATIONALLY EFFICIENT DEMODULATION FOR DIFFERENTIAL PHASE SHIFT KEYING

(75) Inventors: Sabera Kazi, Minneapolis, MN (US); Robert C. Becker, Eden Prairie, MN (US)

(73) Assignee: Honeywell International Inc., Morristown, NJ (US)

( * ) Notice: Subject to any disclaimer, the term of this patent is extended or adjusted under 35 U.S.C. 154(b) by 733 days.

(21) Appl. No.: 10/615,880

(22) Filed: Jul. 10, 2003

(65) Prior Publication Data

US 2005/0008101 A1 Jan. 13, 2005

(51) Int. Cl.
*H03H 7/30* (2006.01)
*H03H 7/40* (2006.01)
*H03K 5/159* (2006.01)

(52) U.S. Cl. .............. 375/330; 375/316; 375/324; 375/329; 375/344

(58) Field of Classification Search ........ 375/279, 375/271, 259, 377, 295, 330, 302, 308, 316, 375/322, 298, 219, 329, 229, 244, 237, 283, 375/340, 346, 348, 362, 324, 326, 344; 455/7, 455/23, 136, 139; 370/351–352, 215–218
See application file for complete search history.

(56) References Cited

U.S. PATENT DOCUMENTS

| | | | | |
|---|---|---|---|---|
| 4,941,155 A * | 7/1990 | Chuang et al. | ............... | 375/330 |
| 5,142,287 A * | 8/1992 | LaBerge et al. | ............... | 342/35 |
| 5,313,493 A * | 5/1994 | Dutta | ..................... | 375/283 |
| 5,432,819 A * | 7/1995 | Mui | ......................... | 375/329 |
| 5,440,267 A * | 8/1995 | Tsuda et al. | ............... | 329/308 |
| 5,450,447 A * | 9/1995 | Dutta | ..................... | 375/344 |
| 5,748,682 A * | 5/1998 | Mobin | ..................... | 375/344 |
| 5,786,725 A * | 7/1998 | Boccuzzi et al. | ............ | 329/304 |
| 5,991,289 A * | 11/1999 | Huang et al. | .............. | 370/350 |
| 6,055,281 A * | 4/2000 | Hendrickson et al. | ....... | 375/329 |
| 6,567,480 B1 * | 5/2003 | Brardjanian et al. | ....... | 375/331 |
| 6,674,822 B1 * | 1/2004 | Legrand et al. | ............ | 375/355 |
| 7,058,151 B1 * | 6/2006 | Kim | ........................... | 375/355 |
| 7,103,027 B2 * | 9/2006 | Dick et al. | .................. | 370/335 |
| 7,164,731 B2 * | 1/2007 | Chung et al. | .............. | 375/316 |
| 2004/0190655 A1 * | 9/2004 | Chung et al. | .............. | 375/346 |

* cited by examiner

*Primary Examiner*—Mohammad H Ghayour
*Assistant Examiner*—Sophia Vlahos
(74) *Attorney, Agent, or Firm*—Fogg & Powers LLC

(57) ABSTRACT

A DPSK demodulator demodulates DPSK signals in a computationally efficient manner to reduce the power requirements of the DPSK demodulator. A DPSK signal is received, digitized, converted to its in-phase (I) and quadrature (Q) components and filtered to remove noise. The I and Q components are processed to determine a relative phase and frequency offset. The phase is adjusted using the frequency offset. The adjusted phase is converted to an absolute phase, which is then mapped to a symbol representative of one or more bits of data.

20 Claims, 8 Drawing Sheets

COMPUTATIONALLY EFFICIENT DEMODULATION FOR DIFFERENTIAL PHASE SHIFT KEYING

BACKGROUND

1. Field of the Invention

Embodiments of the present invention relate generally to the field of communications. More particularly, embodiments of the present invention relate to the field of demodulating differentially encoded phase shift keyed signals.

2. Background of the Invention

Modern communication systems generally require that data be transmitted over distances from a transmitter to a receiver. To conduct communications over such distances, which can be substantial, the data must be modulated on to a carrier frequency in a transmitter, sent to a receiver and then demodulated by the receiver. Numerous modulation techniques are known for carrying out communications over such distances.

Where the data is digital, the information content is carried in binary digits called bits. The bits are combined to form words, which are combined in various ways to carry the desired information. In modern communication systems, symbols representative of one or more bits are sent from the transmitter to the receiver. Communication efficiencies, including bandwidth, power and channel frequency conservation can be gained by choosing symbols that represent a plurality of bits of information.

A variety of modulation techniques exist whereby a symbol can carry information corresponding to one or more bits of information. Such modulation techniques are generally referred to as M-ary modulation, where the M indicates the number of valid symbols in the modulation scheme. For example, in 8-ary modulation, there are 8 valid symbols, each symbol corresponding to 3 bits of information. The symbols are states that can be represented in various forms. For example, the symbols can be represented by phase offsets, frequency offsets, amplitudes or any other quantifiable measure.

One such M-ary technique is M-ary differential phase shift keying (DPSK). M-ary differential phase shift keying is a well known modulation technique that can be used in numerous communication applications. In DPSK systems, symbols are represented by relative phase shifts in the signal from one symbol to the next symbol. Where M is 8 for example, there are 8 valid symbols, each of which corresponds to 3 bits of information. This form of M-ary differential phase shift keying is known as D8PSK. An exemplary bit assignment to 8 valid symbols for a typical D8PSK implementation is illustrated in FIG. 1.

Typically, demodulation of a DPSK signal requires comparing a sample of the signal in a current symbol interval to a sample of the signal that occurred in the previous symbol interval. The comparison provides an estimate of the relative difference from one symbol to the next. The relative phase difference can be mapped to an absolute phase, which then can be mapped to symbols and corresponding bits.

An exemplary conventional DPSK demodulator is illustrated schematically in FIG. 2. A sampled input signal is delayed in delay 203 and conjugated in conjugator 204. The delayed input signal is compared to a current version of the signal in phase comparator 206. The delay is typically one symbol interval in time. In this manner, the current symbol is compared to the prior symbol to determine relative phase difference between the current and previous symbol.

Conventional DPSK demodulators can also include a best sample selection circuit. In a practical DPSK demodulator, a plurality of samples are taken during the time interval of one symbol. This process is generally known as oversampling. The best sample selection circuit determines which sample of the plurality of samples taken per symbol is the best sample to use for further processing. A header consisting of a known sequence of symbols is sent by the transmitter so that the receiver can be synchronized to the transmitted signal. Best sample selector 210 determines the best sample to use based on a correlation of the input signal with this known header that is performed in a correlator 212. If the correlation is above a certain threshold, for example, 80% as determined by a threshold detector 214, the best sample is determined to be that sample which results in the correlation being above the threshold.

Once determined, the particular signal sample to use for further processing is selected using an input gate 208. Input gate 208 is controlled using a gate control signal output from a best sample selector 210. At this point, the threshold circuit turns off the best sample determination process by throwing a switch 216 as the best sample is now known.

In the circuit shown in FIG. 2, correlation is performed on each sample. The correlation and best sample selection processes are very expensive computationally because all computations must be completed with one sample interval. For example, if the header is 80 symbols in length, and the sampling rate is 10 times per symbol, then 800 correlations must be performed every sample interval to determine the best sample. Although processing of the signal subsequent to best sample selection may require significantly fewer calculations per symbol, the correlation and best sample selection processes require a very high minimum processor speed that can be employed to demodulate the signal. This high degree of computation in a short period consumes significant battery power and continues to consume battery power at a high rate even after the correlation and best sample selection processes are completed.

Correlator 212 also provides input to a frequency offset estimator 218. Frequency offset estimator 218 determines whether there is any frequency offset between a local oscillator and the received carrier frequency. Such a frequency offset manifests itself as a progressive phase shift across the samples corresponding to a particular symbol. The progressive phase shift looks like a slope or tilt when plotted versus time across the phase estimates of a symbol. Frequency offset estimator 218 determines the amount of progressive phase shift across the samples of the symbol. Using the progressive phase shift information determined by frequency estimator 218, a frequency correction is calculated in a phase adjuster 220 for each sample of the symbol. The quantities Zq(t) and Zi(t) shown in phase adjuster 220 of FIG. 2 refer to the quadrature and in-phase components of each sample of the symbol.

A circuit 222 determines in which quadrant the phase estimate of the current symbol lies. This is necessary to correct for limitations in typical mathematical functions libraries when used in signal processing applications. The demodulated phase is corrected for frequency offset in phase adder 223. A phase offset correction circuit 224 takes the raw phase data and determines the initial phase. A symbol mapping circuit 226 maps the absolute phase to the appropriate demodulated symbol, which is representative of one or more data bits.

Conventional DPSK demodulators, such as DPSK demodulator 202 illustrated in FIG. 2, use complex mathematics in the correlation of the samples in the message header to determine frequency offset and to demodulate phase angles. Such complex mathematics is computationally expensive, and as a result consume significant amounts of power.

Moreover, once the correlation of the header samples is performed to determine frequency offset, conventional DPSK demodulators no longer check for frequency offset. Rather, they only perform message demodulation under the assumption that the frequency offset will not vary significantly over the duration of the message. Often, this assumption is not valid, and communication quality degrades significantly. Consequently, the ability to track phase and frequency offset errors, which are calculated only from the header correlation, is lost. As a result, additional phase angle and frequency error acquisition and tracking circuitry is often required. Such additional circuitry is also computationally very expensive and consequently, requires a great deal of power.

BRIEF SUMMARY OF THE INVENTION

Embodiments of the present invention perform DPSK demodulation with reduced or no dependence upon complex mathematics and without complex correlation of a known header. In addition, embodiments of the present invention provide for continuous frequency offset tracking and adjustment. Moreover, embodiments of the present invention perform significant demodulation tasks at the symbol rate rather than at the sample rate. Each of these features of the present invention, as well as others to be described subsequently, contribute to the significant computational efficiencies and corresponding reduction in power consumption requirements offered by embodiments of the present invention.

In operation, a DPSK signal is received and digitized. The resulting samples of the signal are converted into their corresponding in-phase (I) and quadrature (Q) components. The I and Q components are filtered to remove noise and input into two circuits.

A differential demodulation circuit compares the I and Q components with a delayed conjugated version of the I and Q components to determine the relative phase between consecutive symbols of the data. A frequency offset calculation circuit compares the I and Q components with a delayed conjugated version of the I and Q components to determine the phase difference between consecutive samples. These phase estimates can be used to determine any frequency offset between the carrier frequency generated by the transmitter and the receiver. The demodulated phase is adjusted by any frequency offset correction. The corrected phase is converted to an absolute phase. The absolute phase is mapped to a corresponding output symbol, from which bits represented by the output symbol are generated, thereby providing a demodulated output.

An improved embodiment of the present invention incorporates an optimum sample calculation circuit. The optimum sample calculation circuit determines the optimum sample to use for subsequent processing. Use of the optimum sample calculation circuit reduced processing requirements from the sample rate to the symbol rate for a significant portion of embodiments of the DPSK demodulator of the present invention.

In an embodiment, the present invention is a DPSK receiver to receive a DPSK signal transmitted by a DPSK transmitter. The DPSK receiver includes an antenna to receive an DPSK input signal, an analog-to-digital converter to digitize the input signal and means for converting the input signal to in-phase and quadrature components. A differential demodulator in the DPSK receiver determines a demodulated phase by comparing the in-phase and quadrature components with a delayed, conjugated version of the in-phase and quadrature components. A frequency offset calculation circuit in the DPSK receiver determines a frequency offset between an oscillator in the DPSK receiver and an oscillator in the DPSK transmitter by comparing the in-phase and quadrature components with a delayed, conjugated version of the in-phase and quadrature components. The DPSK receiver also includes a frequency-offset correction circuit to correct the demodulated phase using the phase error associated with a frequency offset and adding this correction to the phase of the demodulated signal. A phase correction circuit outputs an absolute phase from the corrected phase and a symbol mapping circuit maps the absolute phase to an output symbol comprised of one or more bits of data.

In another embodiment, the present invention is a method for demodulating a DPSK signal. The method includes receiving the DPSK signal, digitizing the DPSK signal and converting the DPSK signal into its corresponding in-phase (I) and quadrature (Q) components. The I and Q components are filtered to remove noise. The method further includes determining a phase associated with the I and Q components by comparing the I and Q components to a first delayed and conjugated version of the I and Q components and determining a phase correction from the determined frequency offset associated with the I and Q components by comparing the I and Q components to a second delayed and conjugated version of the I and Q components. The determined phase is adjusted using the phase correction from the determined frequency offset. The method then continues with converting the adjusted phase to an absolute phase and mapping the absolute phase to a symbol corresponding to one or more data bits.

DETAILED DESCRIPTION OF THE INVENTION

Figure 3:
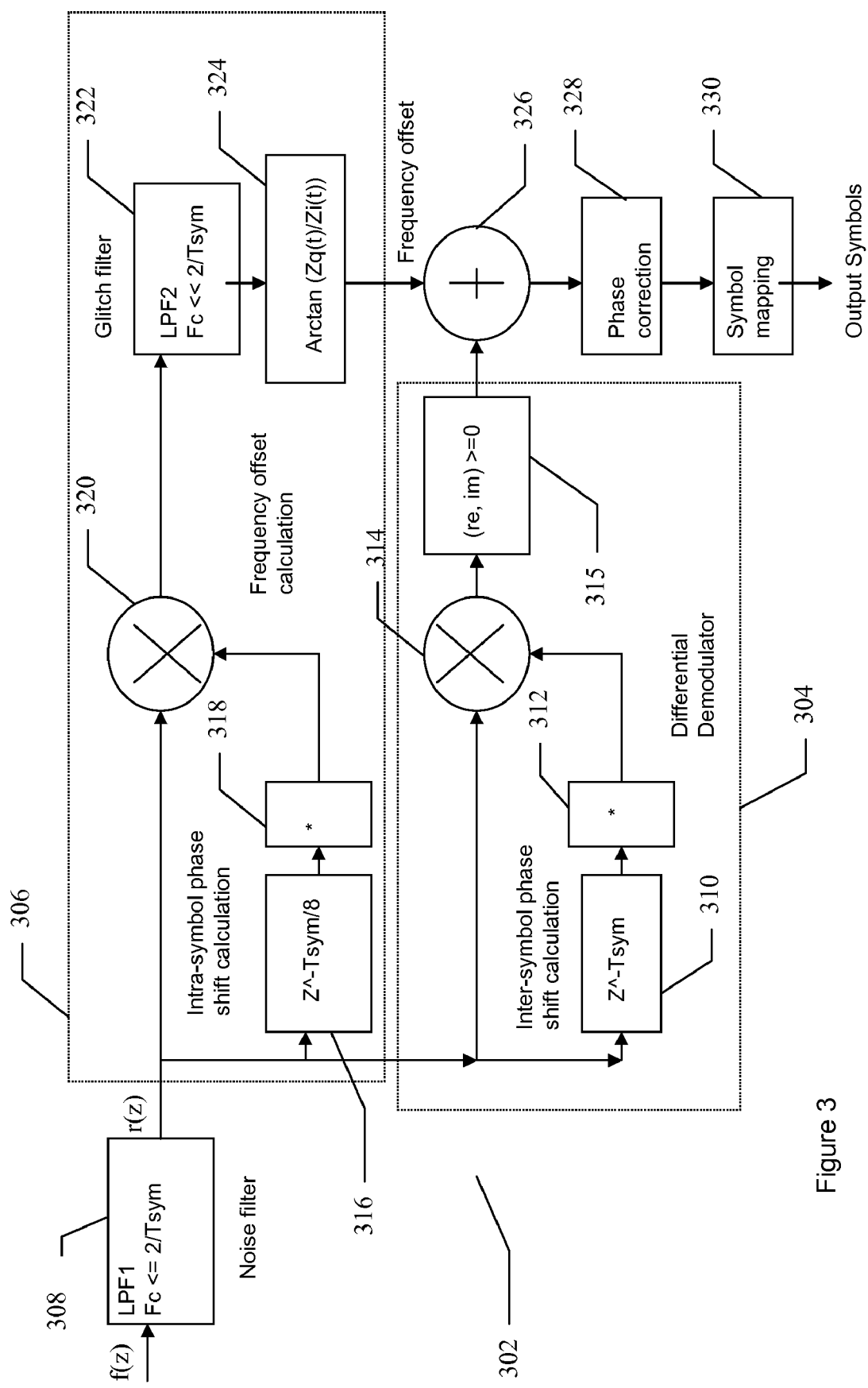
FIG. 3 is a schematic diagram of a DPSK demodulator according to an embodiment of the present invention.

FIG. 3 is a schematic diagram of a computationally efficient M-ary DPSK demodulator 302 for demodulating a received DPSK signal according to an embodiment of the present invention. Demodulator 302 comprises two primary processing circuits. A differential demodulator circuit 304 demodulates the received signal to determine a phase associated with a received symbol. A frequency offset calculation circuit 306 determines any frequency offset associated with the received signal.

The demodulator of the present invention can be used in any DPSK communication application. Such communication applications include, for example, satellite, terrestrial and airborne communications. Further, as will be discussed in more detail subsequently, its low power consumption characteristics make it ideal for use in communication systems having low power consumption requirements.

In operation, DPSK signal is received in a receiver through an antenna. The input signal is sampled in an A/D converter and converted into in-phase (I) and quadrature (Q) components for processing. Techniques for converting the signal to I and Q components are well known. For example, the well-known Hilbert transform can be used for the conversion. In another embodiment of the present invention, the in-phase (I) and quadrature (Q) components are generated by mixing the received signal in two separate mixers driven by a local oscillator. A 90 degree phase delay is inserted between one mixer and the local oscillator, but not between the other mixer and the local oscillator. The output of the mixer that is fed by the delayed local oscillator signal is the quadrature (Q) component and the output of the mixer that is fed by the non-delayed local oscillator signal is the in-phase (I) component.

The I and Q components are filtered in a noise filter 308. In embodiments of the present invention, noise filter 308 is a low pass filter having a cutoff frequency at or somewhat lower than $2/T_{sym}$, where $T_{sym}$ is the symbol rate of the input signal. Noise filter 308 is optimally set to the bandwidth of the data to reduce noise to the extent possible. The filtered I and Q components are input to differential demodulator circuit 304 and a frequency offset calculation circuit 306.

In differential demodulator 304, the input signal (I and Q components) is compared to a delayed conjugated version of itself in a phase detector 314. The delayed conjugated version of the signal is generated by passing the I and Q components through a delay circuit 310 and a conjugator 312. Conjugator 312 reverses the sign of the Q component. The delay circuit delays the I and Q components by the duration of a symbol. As a result, the phase calculation is an inter-symbol phase calculation. The output of phase detector 314 is input to a circuit 315 to calculate phase and to determine in which quadrant the phase is located.

Frequency offset calculator 306 determines a phase correction due to any frequency offset between receiver and transmitter carrier frequency oscillators. In frequency offset calculator 306, the I and Q components are compared to a delayed conjugated version of themselves in a phase detector 320. The delayed conjugated version of the signal is generated by passing the input signal through a delay circuit 316 and a conjugator 318. Conjugator 318 reverses the sign of the Q component. The delay circuit 316 delays the I and Q components for the duration of a sample. That is, the delay is $T_{sym}/N$, where N is preferably number of samples per symbol. Consequently, this calculation is an intra-symbol phase shift calculation.

The output of phase detector 320 is input to glitch filter 322. Glitch filter 322 is a low pass filter that is used to account for large phase shifts that can occur between symbols. In the middle of symbols, there is very little variation in phase. That is, if a symbol angle is 22.5 degrees over the middle part of a sample, the phase is likely to be close to 22.5 degrees when measured near the middle of the symbol.

However, as processing approaches the edge of a symbol time, large glitches can occur in the phase. For example, if the phase shifts from one side of the constellation to the other in moving from one symbol to the next, there would be a large phase shift of 180 degrees. However, typically, the phase shift within one symbol is small. In an exemplary system where the symbol rate is 12k symbols per second, a frequency offset on the order of 100 Hz results in a phase error of 3 degrees across one symbol time. Thus, a low pass filter having an appropriately set cutoff frequency can be used to prevent such large glitches from adversely affecting processing.

In embodiments of the present invention, the cutoff frequency of glitch filter 322 is much less than $2/T_{sym}$, where $T_{sym}$ is the symbol rate. Generally, the cutoff frequency of glitch filter 322 is chosen to minimize delay and maximize noise reduction.

Figure 1:
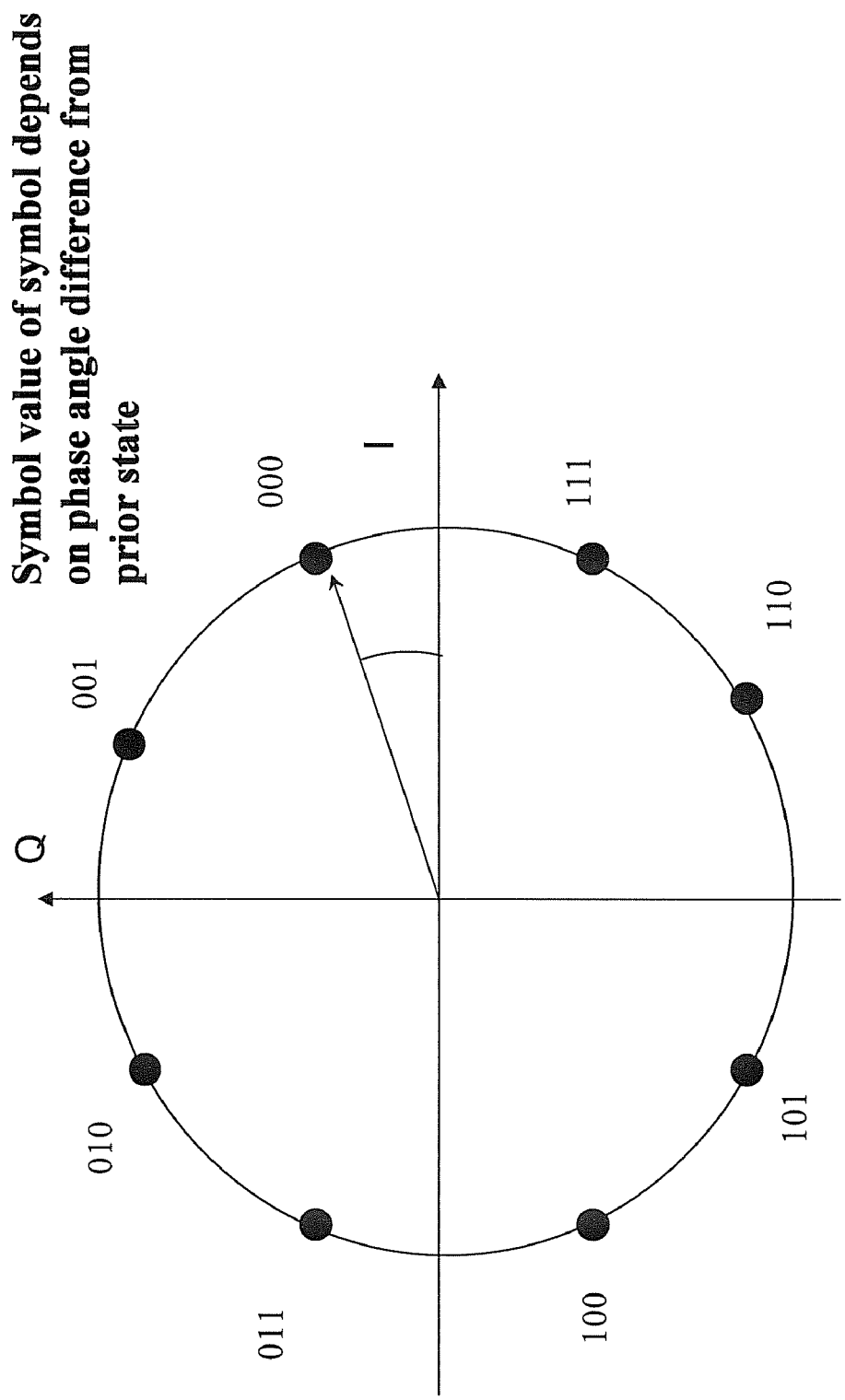
FIG. 1 illustrates bit assignments to valid phase states according to an exemplary D8PSK modulation.
Figure 2:
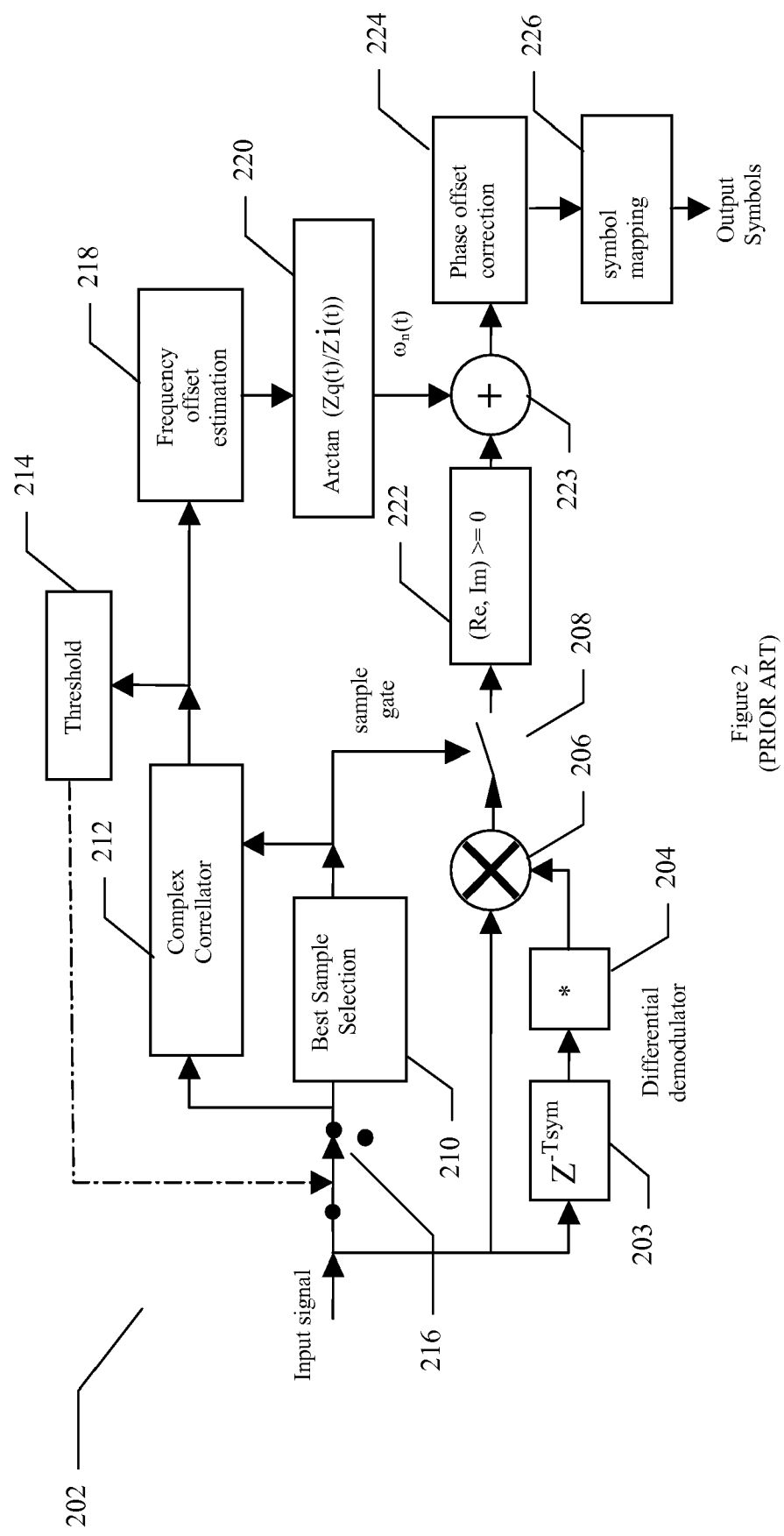
FIG. 2 is a schematic diagram of an exemplary conventional DPSK demodulator.

The output of glitch filter 322 is input to an phase determination circuit 324 that calculates the phase error associated with the frequency offset between the receiver and transmitter oscillators as described above with respect to FIG. 2. The phase error derived from the frequency offset is used to adjust the phase of the symbol determined at the at the output of circuit 315. Phase correction is performed by a phase correction circuit 328. Phase correction circuit 328 determines absolute phase information for the symbol being processed. Symbol mapping is performed in symbol mapping circuit 330, which takes the absolute phase information output by phase correction circuit 328 and converts the phase to symbols.

DPSK demodulator 302 offers several advantages over conventional DPSK demodulators. One advantage is that the complex correlation required for phase angle and frequency offset tracking has been eliminated. Not only does elimination of the correlator result in improved computational efficiency due to the elimination of complex mathematical operations, but it also provides a continuous frequency offset tracking and correction. As a result, the DPSK demodulator of the present invention consumes significantly less power than conventional DPSK demodulators while performing a more robust demodulation. Thus, a DPSK demodulator according to the present invention can be used in low power applications and in applications where frequency offset variations might render less robust DPSK demodulators unusable.

Another significant advantage of the DPSK demodulator of the present invention is that the computationally expensive correlation of the header is no longer required to determine frequency offset or best sample. Consequently, the correlation to determine the location of the header of a message, can be performed at the symbol rate on actual symbols, rather than at the sample rate on samples. Moreover, complex operations are not required to perform the correlation. As a result, significantly fewer computation cycles are required to process a sample allowing the use of a slower signal processor speeds and consequently, less power is required by the embodiments of the present invention than required in conventional DPSK demodulators.

DPSK demodulator 302 can be improved by reducing the processing requirements to the symbol rate for a large portion of the processing. This can be done by determining an optimum sample to use for subsequent processing. Several techniques for determining which sample of a symbol to take can be used in accordance with the present invention. A symbol transition can be detected, and an arbitrary number of samples later can be used. For example, the sixth sample after detection of a symbol transition can arbitrarily be chosen as the point at which to sample each symbol.

Another technique for determining the appropriate sample is to use an optimal sample calculation circuit to best determine the optimal sample to use. The optimal sample calculation circuit calculates the power in the received signal over a symbol time. The optimum sample occurs when the signal power is maximum. The optimum sample calculation circuit also facilitates use of the glitch filter. Due to the large phase shift that can occur from one symbol to another, glitch filter 322 would in most cases require a very large number of taps to adequately minimize the glitches that occur between symbols. In many cases, the large number of taps would be impractical to implement using current DSP technology. Use of the optimal sample calculation circuit determines the appropriate sample to use. The optimum sample is located in a region of the symbol where phase variations across the symbol are very small and this prevents the large inter-symbol glitches from reaching the filter and thereby eliminates much of the phase variation that the glitch filter would otherwise have to remove.

Embodiments of the present invention still use glitch filter 322 to further reduce noise in the signal through the averaging functionality provided by glitch filter 322. As described above, the cutoff frequency of glitch filter 322 is chosen significantly less than $2/T_{sym}$, within the constraint to reduce delay and maximize noise reduction. Alternatively, an averaging circuit can be used to average the data. Such averaging circuits are well known to those skilled in the art.

Figure 4:
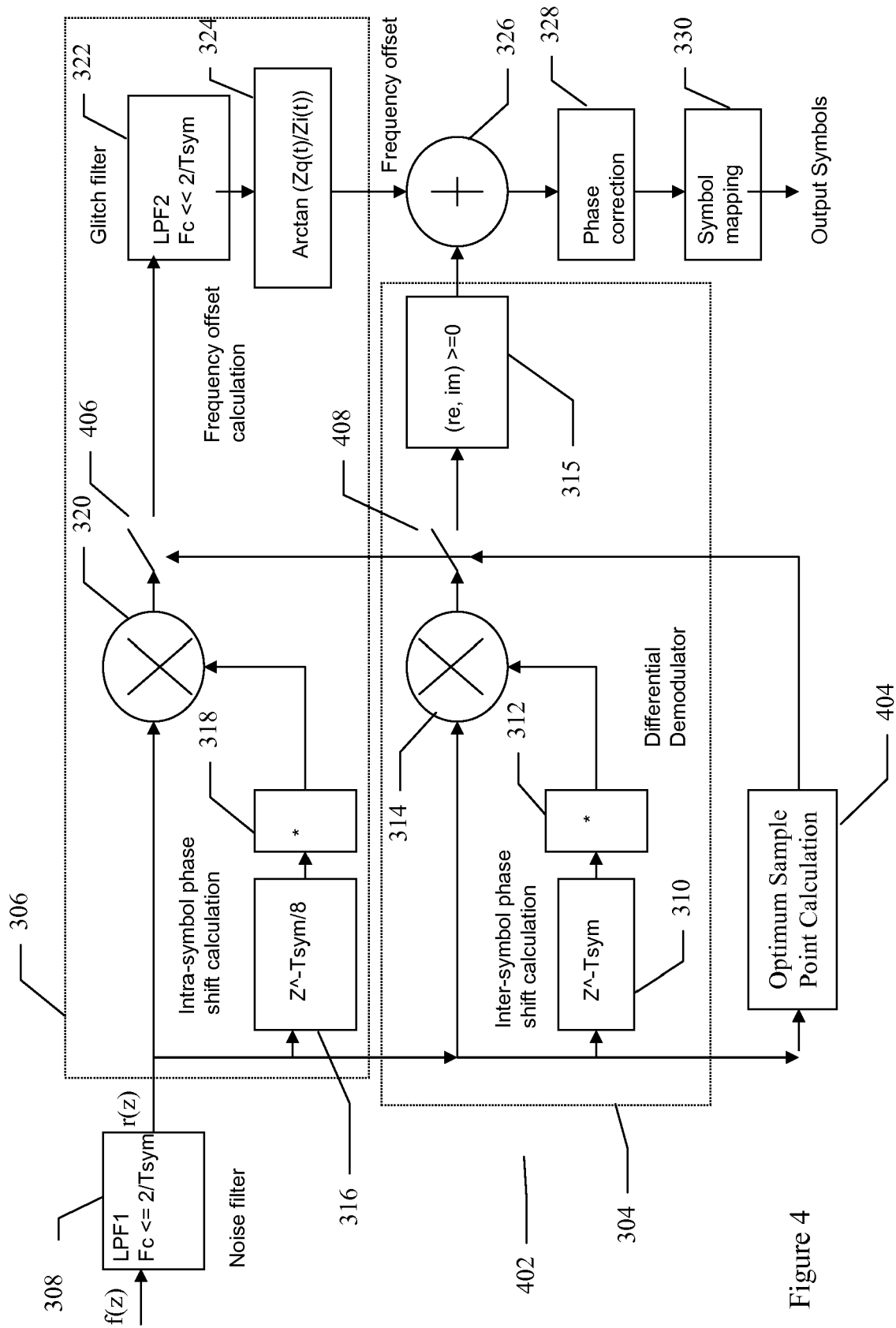
FIG. 4 is a schematic diagram of a DPSK demodulator according to another embodiment of the present invention.

FIG. 4 is a schematic diagram of a computationally efficient M-ary DPSK demodulator 402 for demodulating a received DPSK signal according to an embodiment of the present invention incorporating an optimal sample calculation circuit 404.

The circuit operates in a manner similar to that described above with respect to DPSK demodulator 302 illustrated in FIG. 3. Operational differences due to the addition of an optimal sample calculation circuit 404 are described presently. The I and Q components are input to optimal sample calculation circuit 404. Optimal sample calculation circuit 404 determines which sample is the optimal sample to use in demodulating the signal. In one embodiment of the present invention, this is done by computing the amplitude of each sample for each incoming symbol interval. While amplitude in the strict sense (i.e., root sum square of the I and Q components) can be used, embodiments of the present invention use the sum of the squares of the I and Q components to avoid the processing required to derive the square root. This further improves the efficiency of processing of the present invention.

The sample corresponding to the maximum amplitude (greatest sum of the squares of the I and Q components) is chosen as the sample for processing. This technique relies on the fact that transmitter signal power is at a maximum in the middle of the symbol, when the signal is at a constellation point.

When the maximum amplitude is found a control signal is used to operate gates 406 and 408 to allow the signal into glitch filter 322 and circuit 315. In this manner, embodiments of the present invention using the optimal sampling point calculation circuit 404 significantly reduce processing requirements, by reducing processing for the portions of demodulator 402 after gates 406 and 408 to the symbol rate. In addition, the noisy processing that would otherwise occur between symbols is avoided.

Alternative techniques for determining the optimal sample to use can be employed by optimal sample calculation circuit 404. For example, averaging or curve fitting techniques can be employed to reduce noise that can affect the amplitude calculation. The averaging or curve fitting routine can be used by optimal sample calculation circuit 404 to determine the optimal sample to use for subsequent processing.

Thus, embodiments of the present invention offer several advantages over conventional DPSK demodulators. Significant computation efficiencies are achieved by avoiding correlation at the sample rate to determine an optimal sample and to identify the header. Frequency offset tracking is performed as a part of processing. This is important in applications where frequency offset is likely to change considerably over the duration of a message. Complex mathematical operations are avoided by using separate I and Q channels for processing.

Figure 5:
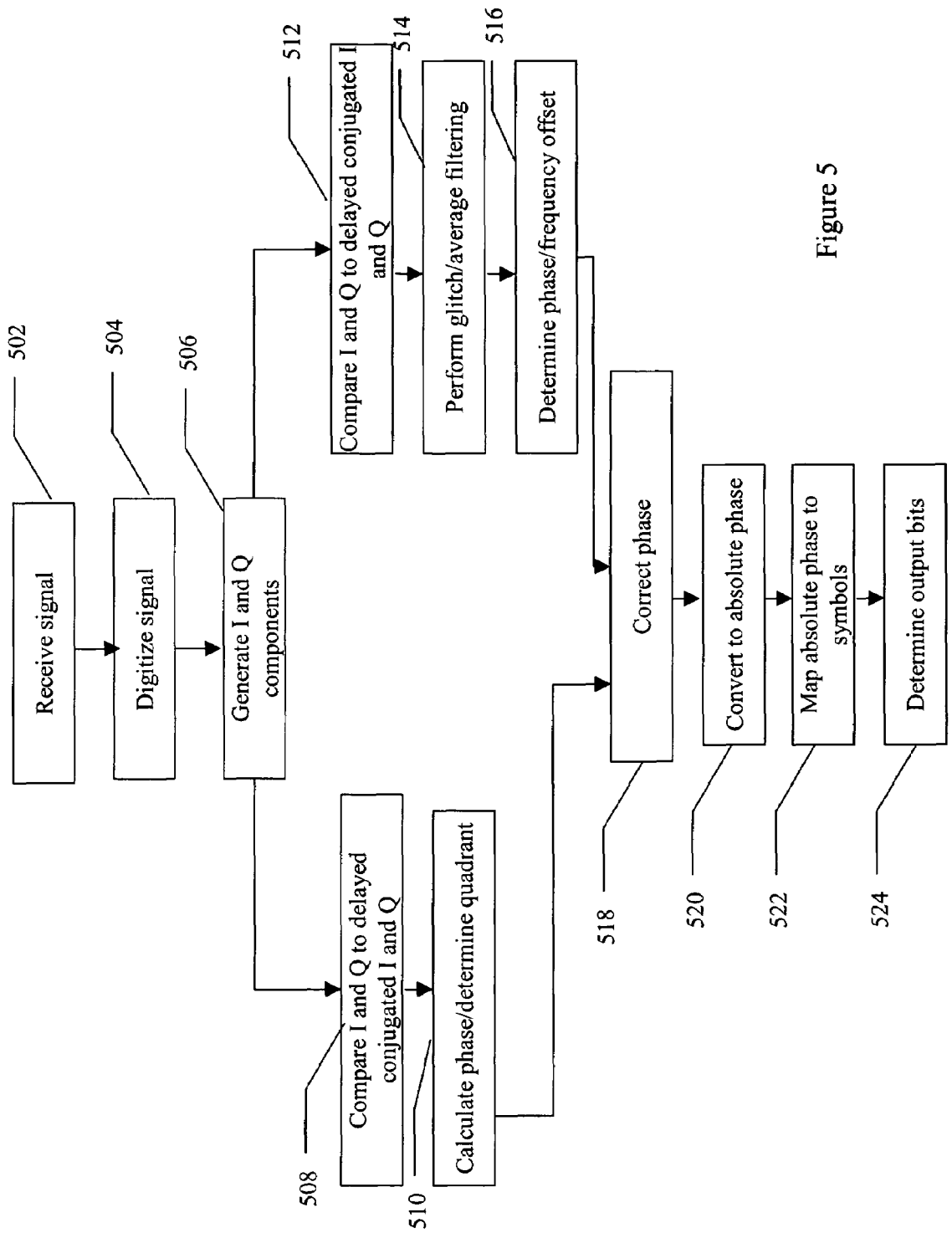
FIG. 5 is a flow chart of a method for demodulating a DPSK signal according to an embodiment of the present invention.

FIG. 5 is a flow chart of a method for demodulating DPSK signals according to a preferred embodiment of the present invention. A DPSK signal is received in step 502, for example by a radio receiver. The signal is digitized in step 504 and converted to its in-phase (I) and quadrature (Q) components in step 506. In step 508, the signal (I and Q components) is compared to a delayed, conjugated version of itself. The delay is preferably one symbol interval. The phase is calculated and quadrant determined in step 510.

At substantially the same time, the signal (I and Q components) is compared to a delayed, conjugated version of itself in step 512. The delay is preferably one sample interval. Glitch or average filtering is performed in step 514. The frequency offset is determined in step 516.

The phase determined in step 510 is corrected for any frequency offset in step 518. An absolute phase corresponding to the corrected phase is determined in step 520. The absolute phase is mapped to symbols in step 522. In step 524, the symbols are converted to data bits.

Furthermore, embodiments of the present invention using an optimum sample calculation circuit reduce computational requirements by reducing processing requirements for portions of DPSK demodulation to the symbol rate, rather than the sample rate. In addition, the ability to perform header correlation at the symbol rate rather than at the sample rate provided by use of an optimum sample calculation circuit further provides computational efficiencies that result in further reduced power requirements of the present invention.

Figure 6:
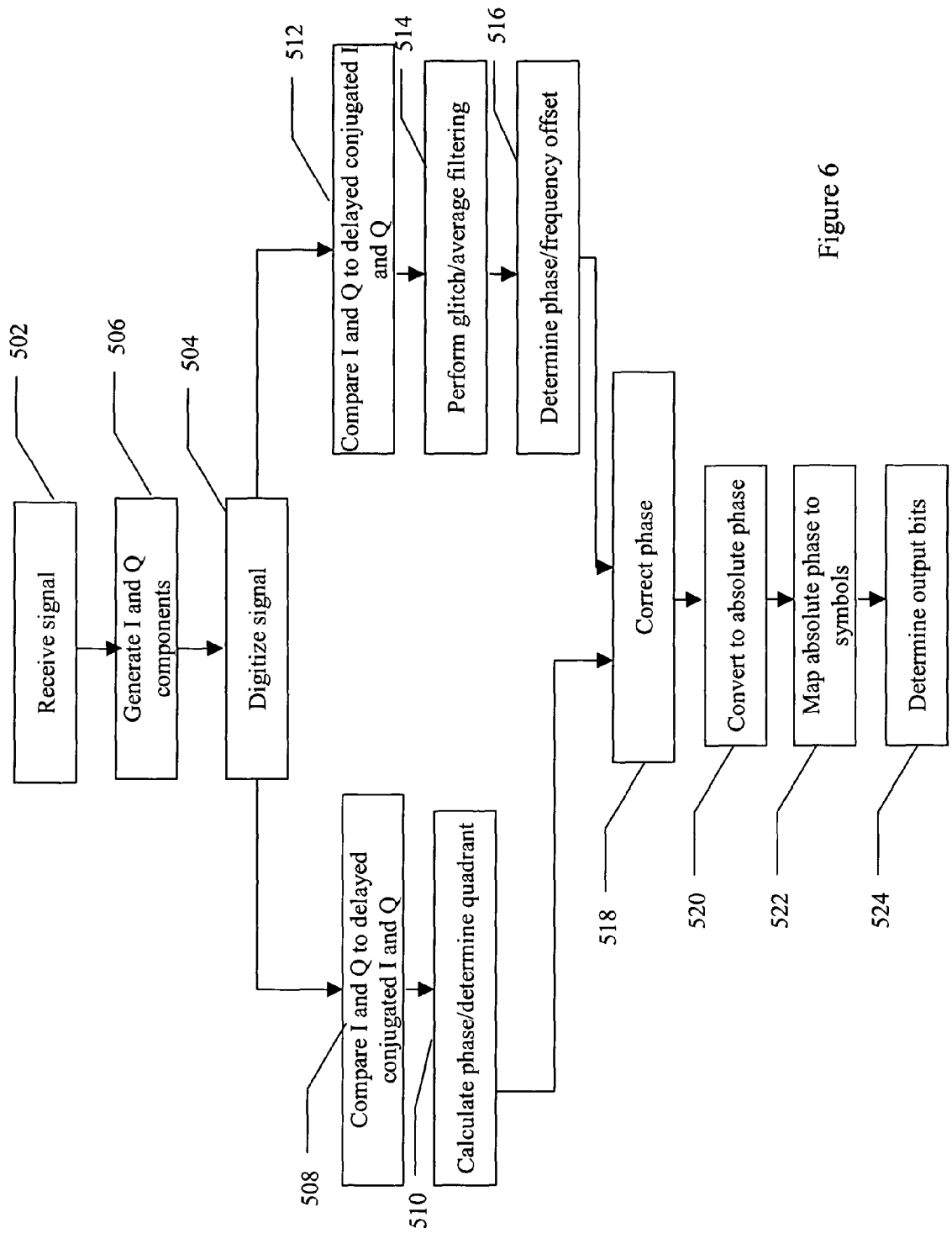
FIG. 6 is a flow chart of an alternative method for demodulating a DPSK signal according to an embodiment of the present invention

FIG. 6 is a flow chart of a method for demodulating DPSK signals according to a preferred embodiment of the present invention using an alternative method of obtaining the in-phase (I) and quadrature (Q) components of the signal. In the alternative embodiment illustrated in FIG. 6, the I and Q components are generated using two mixers driven by a local oscillator with a 90-degree phase delay inserted into one of the local oscillator driving signals, but not the other, as described above. The method illustrated in the flow chart of FIG. 6 operates in an otherwise identical manner to the method described in FIG. 5.

Figure 7:
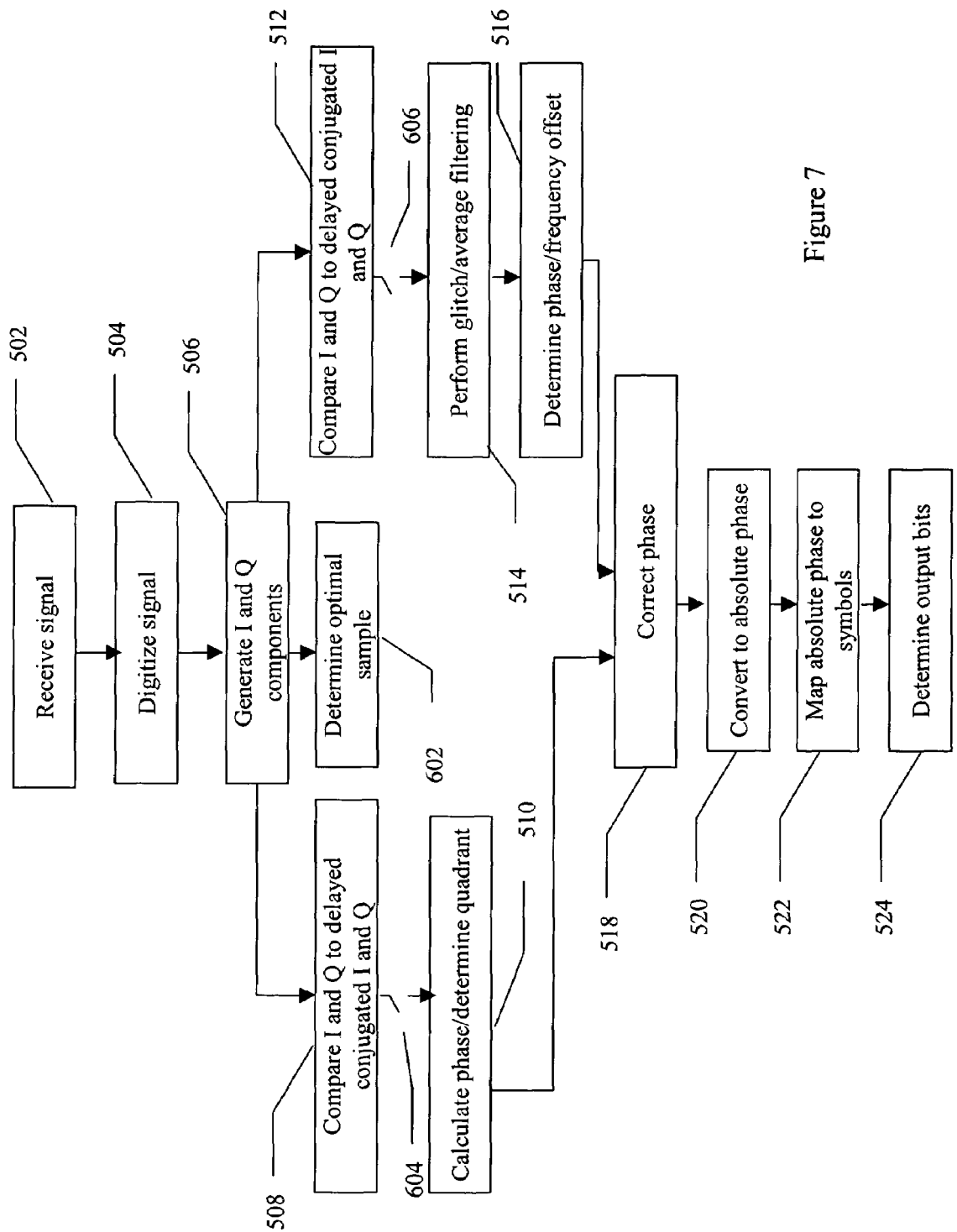
FIG. 7 is a flow chart of an improved method for demodulating a DPSK signal according to an embodiment of the present invention.

FIG. 7 is a flow chart of a method for demodulating DPSK signals according to a preferred embodiment of the present invention using the optimum sample calculation to reduce processing for a portion of the demodulation to the symbol rate. As can be seen, the method illustrated in the flow chart of FIG. 7 operates in a similar manner to the flow chart in FIG. 5 with several additions that are described presently.

Substantially simultaneously with the phase demodulation and frequency offset calculation, the optimal sample is determined in step 602. As described above, the optimal sample can be determined in several ways, including choosing the sample having the greatest amplitude, choosing the sample as an arbitrary number of samples from the estimated or detected beginning of a symbol and curve fitting routines. When the optimum sample is detected, control signals are sent to close gates 604 and 606 so that processing continues in steps 510 and 516 as described above.

Figure 8:
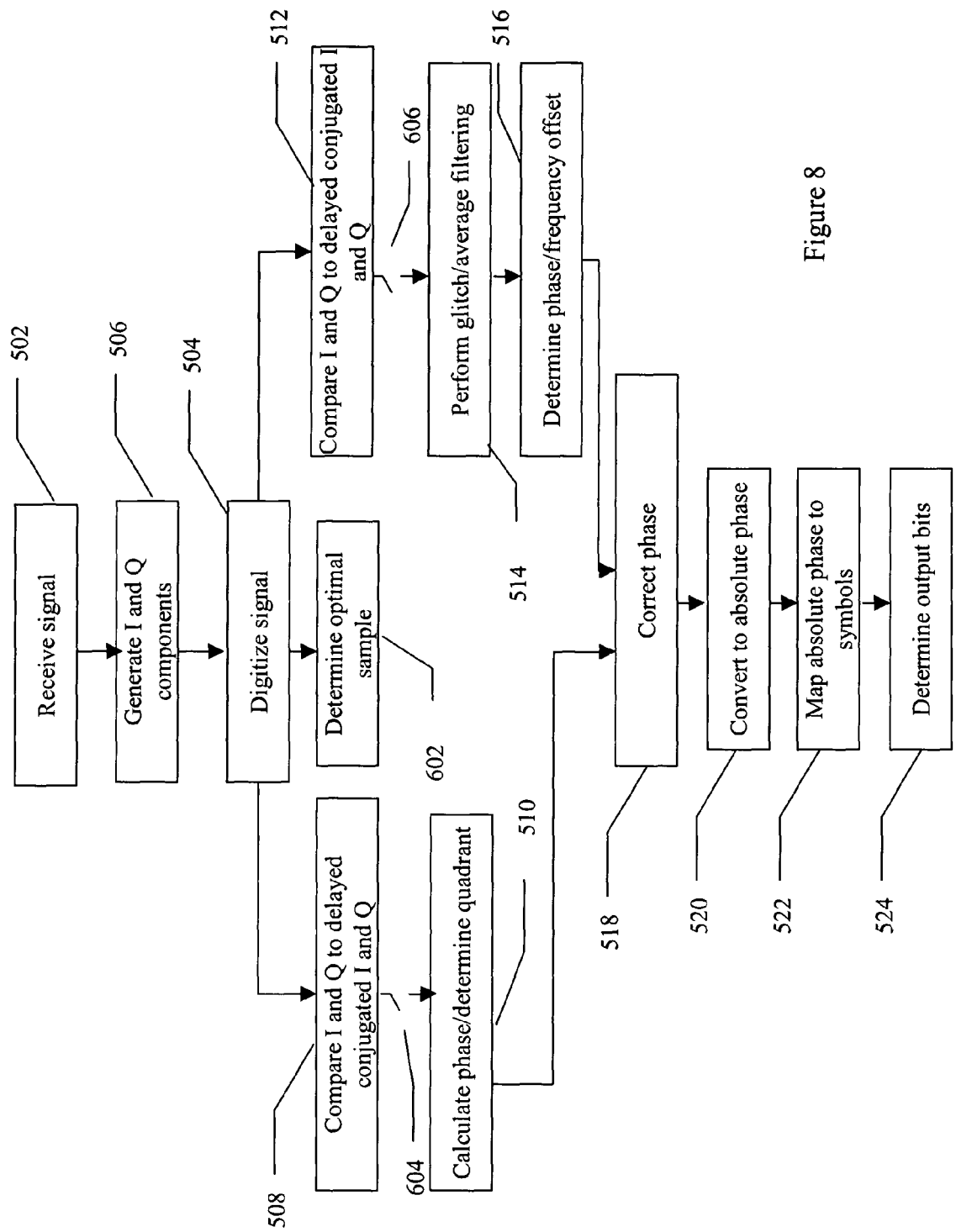
FIG. 8 is a flow chart of an alternative, improved method for demodulating a DPSK signal according to an embodiment of the present invention.

FIG. 8 is a flow chart of a method for demodulating DPSK signals according to a preferred embodiment of the present invention using an alternative method of obtaining the in-phase (I) and quadrature (Q) components of the signal. In the alternative embodiment illustrated in FIG. 8, the I and Q components are generated using two mixers driven by a local oscillator with a 90-degree phase delay inserted into one of the local oscillator driving signals, but not the other, as described above. The method illustrated in the flow chart of FIG. 8 operates in an otherwise identical manner to the method described in FIG. 7.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A differential phase shift keying (DPSK) receiver to receive a DPSK input signal transmitted by a DPSK transmitter, comprising:
   means for converting the input signal to in-phase and quadrature components;
   a differential demodulator to determine a demodulated phase by comparing the in-phase and quadrature components of the input signal with a first delayed, conjugated version of the in-phase and quadrature components of the input signal;
   a frequency offset calculation circuit to determine a frequency offset between an oscillator in the DPSK receiver and an oscillator in the DPSK transmitter by comparing the in-phase and quadrature components of the input signal with a second delayed, conjugated version of the in-phase and quadrature components of the input signal, wherein the delay associated with the second delayed, conjugated version of the in-phase and quadrature components of the input signal is approximately one sample interval, and wherein the approximately one sample interval is less than one symbol interval;
   a frequency correction circuit to correct the demodulated phase using the frequency offset into a corrected phase;
   a phase correction circuit to determine an absolute phase using the corrected phase; and
   a symbol mapping circuit to map the absolute phase to an output symbol, comprising one or more bits of data.

2. The DPSK receiver recited in claim 1, comprising a glitch filter to filter the frequency offsets to remove noise and glitches caused by phase transients between symbols.

3. The DPSK receiver recited in claim 1, wherein the delay associated with the first delayed version of the in-phase and quadrature components of the input signal in the differential demodulator is approximately one symbol interval.

4. The DPSK receiver recited in claim 1, further comprising an optimal sample calculation circuit to determine an optimal sample to use to determine the demodulated phase and the frequency offset.

5. The DPSK receiver recited in claim 4, wherein the optimal sample calculation circuit determines the optimal sample as the sample associated with a peak amplitude of the combined in-phase and quadrature components of each sample in each symbol interval.

6. The DPSK receiver recited in claim 4, comprising a glitch filter to filter the frequency offsets to remove noise and glitches caused by phase transients between symbols.

7. A method for demodulating a differential phase shift keying (DPSK) input signal, comprising:
   receiving the DPSK input signal;
   digitizing the DPSK input signal;
   converting the DPSK input signal into its corresponding in-phase (I) and quadrature (Q) components;
   filtering the I and Q components of the DPSK input signal to remove noise;
   determining a phase associated with the I and Q components of the DPSK input signal by comparing the I and Q components of the DPSK input signal to a first delayed and conjugated version of the I and Q components of the DPSK input signal;
   determining a frequency offset associated with the I and Q components of the DPSK input signal by comparing the I and Q components of the DPSK input signal to a second delayed and conjugated version of the I and Q components of the DPSK input signal, wherein the delay associated with the second delayed and conjugated version of the I and Q components of the DPSK input signal is approximately one sample interval, and wherein the approximately one sample interval is less than one symbol interval;
   adjusting the determined phase using the determined frequency offset;
   converting the adjusted phase to an absolute phase; and
   mapping the absolute phase to a symbol corresponding to one or more data bits.

8. The method recited in claim 7, wherein the step of determining the phase further comprises delaying the I and Q components of the DPSK input signal by approximately one symbol interval and reversing the sign of the Q component to generate the first delayed and conjugated version of the I and Q components of the DPSK input signal.

9. The method recited in claim 7, wherein the step of determining the frequency offset comprises delaying the I and Q components of the DPSK input signal by approximately one sample interval and reversing the sign of the Q component to generate the second delayed and conjugated version of the I and Q components of the DPSK input signal.

10. The method recited in claim 7, further comprising removing glitches caused by phase transients between symbols.

11. The method recited in claim 7, further comprising determining an optimal sample to use in the steps of the determining the phase and frequency offset.

12. The method recited in claim 11, further comprising:
   calculating an amplitude for each sample in a symbol interval; and
   selecting the sample corresponding to the greatest amplitude as the optimal sample.

13. The method recited in claim 11, further comprising removing glitches caused by phase transients between symbols.

14. A system for demodulating a differential phase shift keying (DPSK) input signal, comprising:
  means for converting the DPSK input signal into its corresponding in-phase (I) and quadrature (Q) components;
  means for filtering the I and Q components of the DPSK input signal to remove noise;
  means for determining a phase associated with the I and Q components of the DPSK input signal by comparing the I and Q components of the DPSK input signal to a first delayed and conjugated version of the I and Q components of the DPSK input signal;
  means for determining a frequency offset associated with the I and Q components of the DPSK input signal by comparing the I and Q components of the DPSK input signal to a second delayed and conjugated version of the I and Q components of the DPSK input signal, wherein the delay associated with the second delayed and conjugated version of the I and Q components of the DPSK input signal is approximately one sample interval, and wherein the approximately one sample interval is less than one symbol interval;
  means for adjusting the determine phase using the determined frequency offset;
  means for converting the adjusted phase to an absolute phase; and
  means for mapping the absolute phase to a symbol corresponding to one or more data bits.

15. The system recited in claim 14, further comprising means for delaying the I and Q components of the DPSK input signal by approximately one symbol interval and reversing the sign of the Q component to generate the first delayed and conjugated version of the I and Q components of the DPSK input signal.

16. The system recited in claim 14, further comprising means for delaying the I and Q components of the DPSK input signal by approximately one sample interval and reversing the sign of the Q component to generate the second delayed and conjugated version of the I and Q components of the DPSK input signal.

17. The system recited in claim 14, further comprising means for removing glitches caused by phase transients between symbols.

18. The system recited in claim 14, further comprising means for determining an optimal sample to use for determining the phase and frequency offset.

19. The system recited in claim 18, further comprising:
  means for calculating an amplitude for each sample in a symbol interval; and
  means for selecting the sample corresponding to the greatest amplitude as the optimal sample.

20. The system recited in claim 19, further comprising means for removing glitches caused by phase transients between symbols.

* * * * *